United States Patent
Choi et al.

(10) Patent No.: US 11,267,964 B2
(45) Date of Patent: Mar. 8, 2022

(54) THERMOPLASTIC RESIN COMPOSITION AND THERMOPLASTIC RESIN MOLDED ARTICLE PREPARED BY USING THE SAME

(71) Applicant: LG CHEM, LTD., Seoul (KR)

(72) Inventors: Jeong Su Choi, Daejeon (KR); Won Seok Lee, Daejeon (KR); Roo Da Lee, Daejeon (KR); Jong Ju Lee, Daejeon (KR); Keun Hoon Yoo, Daejeon (KR); Seok Goo Jang, Daejeon (KR); Sang Hoo Park, Daejeon (KR); Hye Jeong Ok, Daejeon (KR); Ho Hoon Kim, Daejeon (KR); Hyung Seop Shim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 23 days.

(21) Appl. No.: 16/630,805

(22) PCT Filed: Sep. 20, 2018

(86) PCT No.: PCT/KR2018/011107
§ 371 (c)(1),
(2) Date: Jan. 13, 2020

(87) PCT Pub. No.: WO2019/066375
PCT Pub. Date: Apr. 4, 2019

(65) Prior Publication Data
US 2020/0140672 A1 May 7, 2020

(30) Foreign Application Priority Data
Sep. 29, 2017 (KR) .................. 10-2017-0127617

(51) Int. Cl.
*C08L 51/04* (2006.01)
*C08L 33/12* (2006.01)

(52) U.S. Cl.
CPC .............. *C08L 51/04* (2013.01); *C08L 33/12* (2013.01)

(58) Field of Classification Search
CPC .................................................. C08F 285/00
See application file for complete search history.

(56) References Cited

U.S. PATENT DOCUMENTS

| | | | |
|---|---|---|---|
| 4,767,833 A | 8/1988 | Yumoto et al. | |
| 5,654,356 A | 8/1997 | Namiki et al. | |
| 5,891,962 A | 4/1999 | Otsuzuki et al. | |
| 9,834,645 B2 | 12/2017 | Yoo et al. | |
| 2001/0004658 A1 | 6/2001 | Stieneker et al. | |
| 2005/0107540 A1 | 5/2005 | Yoo et al. | |
| 2006/0041062 A1 | 2/2006 | Choi et al. | |
| 2009/0043047 A1 | 2/2009 | Ha et al. | |
| 2014/0039122 A1* | 2/2014 | Mestach ................. | C08F 2/001 524/745 |
| 2014/0186612 A1 | 7/2014 | Kwon et al. | |
| 2015/0005425 A1 | 1/2015 | Ahn et al. | |
| 2016/0053099 A1* | 2/2016 | Chai ..................... | C08F 285/00 525/87 |
| 2016/0200937 A1* | 7/2016 | Hu ....................... | C09D 163/00 523/122 |
| 2017/0183455 A1 | 6/2017 | Yoo et al. | |
| 2018/0002521 A1 | 1/2018 | Jang et al. | |
| 2019/0085116 A1* | 3/2019 | Corten ................. | C08G 18/664 |
| 2020/0017686 A1* | 1/2020 | Iwanaga ................ | C08L 83/10 |

FOREIGN PATENT DOCUMENTS

| | | |
|---|---|---|
| DE | 19961894 A1 | 6/2001 |
| EP | 0703252 B1 | 5/2001 |
| JP | H08199008 A | 8/1996 |
| JP | H11147020 A | 6/1999 |
| JP | 2001172341 A | 6/2001 |
| JP | 2006307026 A | 11/2006 |
| KR | 20060016853 A | 2/2006 |
| KR | 20070108008 A | 11/2007 |
| KR | 20130046162 A | 5/2013 |
| KR | 20130082221 A | 7/2013 |
| KR | 20150137558 A | 12/2015 |
| KR | 1020160032668 A | 3/2016 |
| KR | 101743326 B1 | 6/2017 |
| KR | 20170069456 A | 6/2017 |

OTHER PUBLICATIONS

LG Chemical, translation of (Kr 20130082221), Oct. 2015.*
Search Report dated Feb. 28, 2019 for PCT Application No. PCT/KR2018/011107.
Search Report dated May 19, 2020 for European Application No. 18862507.3.

* cited by examiner

*Primary Examiner* — Jeffrey C Mullis

(57) ABSTRACT

The present invention relates to a thermoplastic resin composition showing excellent transparency and whitening resistance. The thermoplastic resin composition of the present invention comprises (A) a graft copolymer having a multilayer structure and (B) a thermoplastic copolymer, wherein the graft copolymer having a multilayer structure (A) comprises a core of a conjugated diene-based rubber latex having a weight average particle diameter of 500 Å to 2,000 Å; an intermediate layer; and a graft layer. The glass transition temperature of the intermediate layer is 40° C. or less, the glass transition temperature of the graft layer is 80° C. or more, and the refractive index difference between the graft copolymer (A) and the thermoplastic copolymer (B) is less than 0.01.

16 Claims, 1 Drawing Sheet

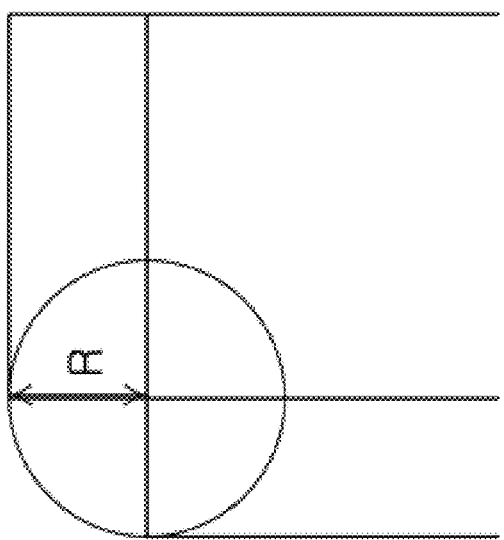
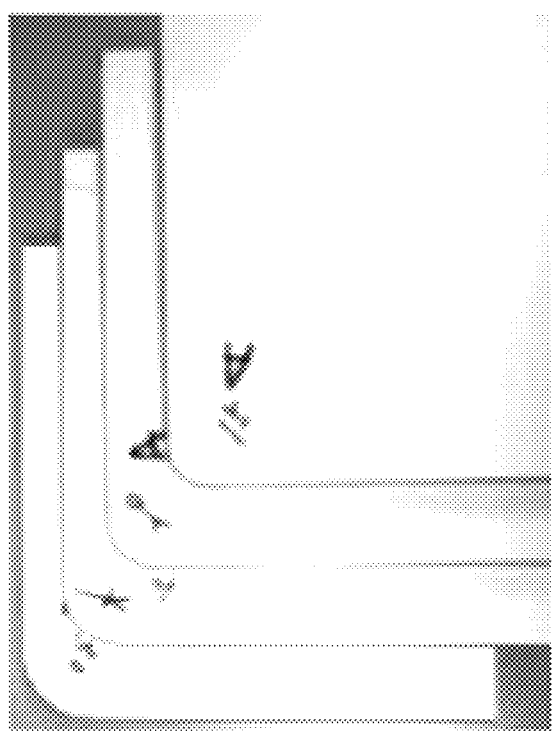

THERMOPLASTIC RESIN COMPOSITION AND THERMOPLASTIC RESIN MOLDED ARTICLE PREPARED BY USING THE SAME

CROSS-REFERENCE TO RELATED APPLICATIONS

The present application claims the benefit of priority based on Korean Patent Application No. 10-2017-0127617, filed on Sep. 29, 2017, the entire contents of which are incorporated herein by reference.

TECHNICAL FIELD

The present invention relates to a thermoplastic resin composition having excellent whitening resistance and excellent softness properties and a thermoplastic resin molded product manufactured therefrom, and more particularly, to a thermoplastic resin composition having excellent whitening resistance even at a small radius of curvature and a thermoplastic resin molded product manufactured therefrom.

BACKGROUND ART

Furniture edge mainly uses a polyvinyl chloride (PVC) resin, an acrylonitrile-butadiene-styrene (ABS) resin, a polyethylene terephthalate (PET) resin, etc., as a finishing material of the edge part of furniture, and particularly, an impact-resistant polymethylmethacrylate (PMMA) resin which has the high content of an impact reinforcing agent is used for the edge of high-quality furniture.

Generally, a resin is used in an edge by performing a process of extruding a resin to form a roll shape, a process of transcribing various patterns, a process of attaching to furniture, and a process of cutting and trimming for finishing. The furniture edge of an impact-resistant polymethylmethacrylate resin material results in a high defect ratio due to the generation of whitening and crack during performing such transcribing, attaching, cutting and trimming processes or during using. Accordingly, the development of a material which has excellent transparency and does not induce whitening and crack during manufacturing or using furniture edge, is required.

Particularly, according to the recent design trend of furniture edge, an edge with a low radius of curvature is increasingly used and a bending plane becomes further sharpened, and thus, remarkable defects are shown due to the generation of whitening. Accordingly, the development of a resin which does not induce whitening at a low radius of curvature is necessary.

An acrylonitrile-butadiene-styrene (ABS) ternary copolymer resin is an opaque resin which keeps a balance among physical properties such as impact strength and flowability. In order to impart the ABS resin with transparency, for example, U.S. Pat. No. 4,767,833, Japanese Laid-open Patent Publication No. Hei 11-147020, European Patent No. 703,252, and Japanese Laid-open Patent Publication No. Hei 8-199008 disclose methods for imparting an acrylonitrile-butadiene-styrene (ABS) resin which has excellent impact resistance, chemical resistance, processability, etc., with transparency by introducing an acrylic acid alkyl ester or methacrylic acid alkyl ester compound.

However, if the transparent ABS resins disclosed in the documents are used for processing furniture edge, a lot of whitening and cracks may be easily generated. Accordingly, the application thereof is limited.

Therefore, the development of a resin having excellent transparency, and excellent whitening resistance even at a small radius of curvature, is necessary.

DISCLOSURE OF THE INVENTION

Technical Problem

The task to be solved in the present invention is to provide a thermoplastic resin composition which shows excellent transparency and whitening resistance.

Another task to be solved in the present invention is to provide a thermoplastic resin molded product which is manufactured from the thermoplastic resin composition.

Technical Solution

To solve the above-described tasks, the present invention provides a thermoplastic resin composition comprising (A) a graft copolymer having a multilayer structure, and (B) a thermoplastic copolymer, wherein the graft copolymer having a multilayer structure (A) comprises: (A-1) a core of (a) a conjugated diene-based rubber latex; and (A-2) an intermediate layer comprising a repeating unit derived from (b) a (meth)acrylic acid ester compound, a repeating unit derived from (c) an aromatic vinyl compound, and a repeating unit derived from (d) a vinyl cyan compound; and (A-3) a graft layer comprising a repeating unit derived from (b) a (meth)acrylic acid ester compound, a repeating unit derived from (c) an aromatic vinyl compound, and a repeating unit derived from (d) a vinyl cyan compound, the core (A-1) of (a) the conjugated diene-based rubber latex has a weight average particle diameter of 500 Å to 2,000 Å, a glass transition temperature of the intermediate layer (A-2) is 40° C. or less, and the glass transition temperature of the graft layer (A-3) is 80° C. or more, the thermoplastic copolymer (B) comprises a repeating unit derived from (b) a (meth)acrylic acid ester compound, a repeating unit derived from (c) an aromatic vinyl compound, and a repeating unit derived from (d) a vinyl cyan compound, and a difference of refractive indexes between the graft copolymer having a multilayer structure (A) and the thermoplastic copolymer (B) is less than 0.01.

Advantageous Effects

The thermoplastic resin composition according to the present invention has excellent transparency and excellent whitening resistance at a small radius of curvature, and accordingly, may be usefully used in a product requiring a material having whitening resistance at a small radius of curvature such as furniture edge.

BRIEF DESCRIPTION OF THE DRAWING

The FIGURE is a diagram for explaining the evaluation method of whitening resistance.

BEST MODE FOR CARRYING OUT THE INVENTION

Hereinafter, the present invention will now be described in more detail in order to assist the understanding of the present invention.

It will be understood that words or terms used in the specification and claims shall not be interpreted as the meaning defined in commonly used dictionaries. It will be further understood that the words or terms should be interpreted as having a meaning that is consistent with their meaning in technical idea of the invention, based on the principle that an inventor may properly define the meaning of the words or terms to best explain the invention.

The thermoplastic resin composition of the present invention is a thermoplastic resin composition comprising (A) a graft copolymer having a multilayer structure, and (B) a thermoplastic copolymer, wherein the graft copolymer having a multilayer structure (A) comprises: (A-1) a core of (a) a conjugated diene-based rubber latex; and (A-2) an intermediate layer comprising a repeating unit derived from (b) a (meth)acrylic acid ester compound, a repeating unit derived from (c) an aromatic vinyl compound, and a repeating unit derived from (d) a vinyl cyan compound; and (A-3) a graft layer comprising a repeating unit derived from (b) a (meth)acrylic acid ester compound, a repeating unit derived from (c) an aromatic vinyl compound, and a repeating unit derived from (d) a vinyl cyan compound, (A-1) (a) the core of the conjugated diene-based rubber latex has a weight average particle diameter of 500 Å to 2,000 Å, a glass transition temperature of the intermediate layer (A-2) is 40° C. or less, and the glass transition temperature of the graft layer (A-3) is 80° C. or more, the thermoplastic copolymer (B) comprises a repeating unit derived from (b) a (meth) acrylic acid ester compound, a repeating unit derived from (c) an aromatic vinyl compound, and a repeating unit derived from (d) a vinyl cyan compound, and a difference of refractive indexes between the graft copolymer having a multilayer structure (A) and the thermoplastic copolymer (B) is less than 0.01.

The thermoplastic resin composition of the present invention comprises the graft copolymer having a multilayer structure (A) and the thermoplastic copolymer (B) in an optimized mixing ratio, and comprises each component constituting the graft copolymer having a multilayer structure (A) and the thermoplastic copolymer (B) in optimized amounts, thereby showing excellent whitening resistance and transparency.

Hereinafter, the thermoplastic resin composition of the present invention will be explained in more detail.

(A) Graft Copolymer Having a Multilayer Structure

The kind and amounts of the repeating units constituting the graft copolymer (A) having a multilayer structure may be appropriately determined under conditions of making a refractive index difference with respect to the (B) thermoplastic copolymer of less than 0.01, particularly, less than 0.005.

In the present invention, the term "refractive index" refers to an absolute refractive index of a material (for example, monomer or polymer), and the refractive index is recognized as the ratio of the rate of electromagnetic radiant rays in a free space to the rate of radiant rays in the material. In this case, the radiant rays correspond to visible light with a wavelength of 450 nm to 680 nm. The refractive index may be measured by a known method, that is, may be commonly measured by using an Abbe refractometer.

The graft copolymer having a multilayer structure (A) comprises (A-1) a core of (a) a conjugated diene-based rubber latex; (A-2) an intermediate layer comprising a repeating unit derived from (b) a (meth)acrylic acid ester compound, a repeating unit derived from (c) an aromatic vinyl compound, and a repeating unit derived from (d) a vinyl cyan compound; and (A-3) a graft layer comprising a repeating unit derived from (b) a (meth)acrylic acid ester compound, a repeating unit derived from (c) an aromatic vinyl compound, and a repeating unit derived from (d) a vinyl cyan compound.

The graft copolymer having a multilayer structure (A) may comprise the core (A-1), the intermediate layer (A-2) and the graft layer (A-3) in amounts of 20 parts by weight to 80 parts by weight, 10 parts by weight to 40 parts by weight, and 10 parts by weight to 40 parts by weight, respectively, particularly, in amounts of 40 parts by weight to 60 parts by weight, 10 parts by weight to 30 parts by weight, and 20 parts by weight to 40 parts by weight, respectively.

If the core (A-1), the intermediate layer (A-2) and the graft layer (A-3) have the above-mentioned amounts, grafting of the graft copolymer having a multilayer structure during graft polymerizing may be appropriately carried out to improve mechanical properties and balance among the physical properties.

If the amount of the core (A-1) is less than the above-mentioned range, the probability of generating cracks during processing as furniture edge using a thermoplastic resin composition may increase, and if the amount of the core (A-1) is greater than the above-mentioned range, grafting during graft polymerizing the graft copolymer may not be appropriately carried out to degrade transparency.

In addition, if the amount of the intermediate layer (A-2) is smaller than the above-mentioned range, whitening may occur at a small radius of curvature, and if the amount of the intermediate layer (A-2) is greater than the above-mentioned range, defects of sheet distortion may arise during extrusion processing for manufacturing a molded product, and the processability of a thermoplastic resin may be degraded.

Meanwhile, if the amount of the graft layer (A-3) is smaller than the above-mentioned range, the transparency of the thermoplastic resin composition may be degraded, and if the amount of the graft layer (A-3) is greater than the above-mentioned range, whitening may arise at a small radius of curvature.

In the graft copolymer having a multilayer structure (A), the conjugated diene-based rubber latex (a), that is, the conjugated diene-based rubber latex core (A-1) may have a weight average particle diameter of 500 Å to 2,000 Å, particularly, a weight average particle diameter of 500 Å to 1,600 Å. If the weight average particle diameter of the conjugated diene-based rubber latex (a) satisfies the above-mentioned range, excellent transparency and whitening resistance may be accomplished. If the weight average particle diameter of the conjugated diene-based rubber latex (a) is smaller than the above-mentioned range, a large amount of an emulsifier is necessary and transparency may be degraded due to remaining emulsifier, and if the weight average particle diameter is greater than the above-mentioned range, whitening may arise.

In the thermoplastic resin composition of the present invention, the intermediate layer (A-2) may be a polymerized product of a composition comprising a (meth)acrylic acid ester compound (b), an aromatic vinyl compound (c), and a vinyl cyan compound (d), and the intermediate layer (A-2) may comprise a repeating unit derived from the (meth)acrylic acid ester compound (b), a repeating unit derived from the aromatic vinyl compound (c), and a repeating unit derived from the vinyl cyan compound (d), in amounts of 35 parts by weight to 80 parts by weight, 20 parts by weight to 60 parts by weight, and 0.1 parts by weight to 15 parts by weight, respectively, particularly, in amounts of 42 parts by weight to 70 parts by weight, 30 parts by weight to 52 parts by weight, and 1 part by weight to 13 parts by weight, respectively. If the intermediate layer (A-2) comprises the repeating unit derived from the (meth)acrylic acid ester compound (b), the repeating unit derived from the aromatic vinyl compound (c), and the repeating unit derived from the vinyl cyan compound (d), in the above-mentioned ranges, respectively, the thermoplastic resin composition may show excellent transparency and whitening resistance.

If the intermediate layer (A-2) comprises the repeating unit derived from the (meth)acrylic acid ester compound (b), the repeating unit derived from the aromatic vinyl compound (c), and the repeating unit derived from the vinyl cyan compound (d), in amounts deviated from the above-mentioned ranges, the transparency of the thermoplastic resin composition may be degraded, if the amount of the repeating unit derived from the (meth)acrylic acid ester compound (b) deviates from the above-mentioned range, transparency may be degraded, if the amount of the repeating unit derived from the vinyl cyan compound (d) is greater than the above-mentioned range, the yellowing of a resin may arise and a large amount of solid content (coagulum) may be produced during polymerization.

The graft layer (A-3) is a polymerization product of a composition comprising (b) a (meth)acrylic acid ester compound, (c) an aromatic vinyl compound, and (d) a vinyl cyan compound, and may comprise a repeating unit derived from the (meth)acrylic acid ester compound (b), a repeating unit derived from the aromatic vinyl compound (c), and a repeating unit derived from the vinyl cyan compound (d), in amounts of 35 parts by weight to 80 parts by weight, 15 parts by weight to 50 parts by weight, and 0.1 parts by weight to 20 parts by weight, respectively, particularly, in amounts of 45 parts by weight to 75 parts by weight, 20 parts by weight to 40 parts by weight, and 1 part by weight to 13 parts by weight, respectively.

If the graft layer (A-3) comprises the repeating unit derived from the (meth)acrylic acid ester compound (b), the repeating unit derived from the aromatic vinyl compound (c), and the repeating unit derived from the vinyl cyan compound (d), in the above-mentioned ranges, respectively, the thermoplastic resin composition may show excellent transparency and whitening resistance.

If the graft layer (A-3) comprises the repeating unit derived from the (meth)acrylic acid ester compound (b), the repeating unit derived from the aromatic vinyl compound (c), and the repeating unit derived from the vinyl cyan compound (d), in amounts deviated from the above-mentioned ranges, the transparency of the thermoplastic resin composition may be degraded, if the amount of the repeating unit derived from the (meth)acrylic acid ester compound (b) deviates from the above-mentioned range, transparency may be degraded, if the amount of the repeating unit derived from the vinyl cyan compound (d) is greater than the above-mentioned range, the yellowing of a resin may arise and a large amount of solid content (coagulum) may be produced during polymerization.

In the thermoplastic resin composition of the present invention, the transparency of the graft copolymer having a multilayer structure (A) is determined by the refractive indexes of the core (A-1), the intermediate layer (A-2) and the graft layer (A-3), and the refractive index of each polymer is controlled by the mixing ratio of monomers used during polymerization. Transparency may be achieved by controlling the refractive indexes of the core (A-1), the intermediate layer (A-2) and the graft layer (A-3) equally or similarly, and the control of the refractive index may be achieved by controlling the mixing ratio of monomers during forming the core and each layer.

The difference among the refractive indexes of the core (A-1), the intermediate layer (A-2) and the graft layer (A-3) may be less than 0.01. That is, ach difference between refractive indexes of the core (A-1) and the intermediate layer (A-2); the core (A-1) and the graft layer (A-3); and the intermediate layer (A-2) and the graft layer (A-3) may be less than 0.01, respectively. The refractive index difference may particularly be less than 0.005, more particularly, less than 0.003. If the refractive index difference is greater than the above-mentioned value, the transparency of the thermoplastic resin composition may be degraded.

The polymer refractive index of a monomer used for preparing the thermoplastic resin composition according to an embodiment of the present invention may be, for example, 1.518 for butadiene, 1.465 for butyl acrylate, 1.49 for methyl methacrylate, 1.59 for styrene, and 1.52 for acrylonitrile.

The refractive index of the graft copolymer having a multilayer structure (A) may be calculated using the refractive index and content of a repeating unit derived from a monomer (polymer derived from a monomer) included in the graft copolymer having a multilayer structure (A) according to the following Mathematical Equation 1:

$$RI=\Sigma(Wti \times RIi)$$ [Mathematical Equation 1]

In Mathematical Equation 1, Wti is a weight fraction (%) of a repeating unit (or polymer) derived from each monomer in the intermediate layer (A-2) or the graft layer (A-3), and RIi is the refractive index of a homopolymer of each monomer (refractive index of a polymer forming the intermediate layer (A-2) or the graft layer (A-3)).

In the thermoplastic resin composition according to an embodiment of the present invention, the intermediate layer (A-2) and the graft layer (A-3) may have different glass transition temperatures, and the glass transition temperature the intermediate layer (A-2) and the graft layer (A-3) may have a difference of 40° C. or more, particularly, a difference of 40° C. to 160° C. In addition, particularly, the glass transition temperature of the intermediate layer (A-2) may be 40° C. or less, and the glass transition temperature of the graft layer (A-3) may be 80° C. or more, and more particularly, the glass transition temperature of the intermediate layer (A-2) may be −50° C. to 40° C., and the glass transition temperature of the graft layer (A-3) may be 80° C. to 110° C. If the intermediate layer (A-2) and the graft layer (A-3) have different glass transition temperatures in the above-mentioned ranges, the energy absorption with respect to deformation such as bending may become easy.

The conjugated diene-based rubber latex (a) may be a homopolymer of a conjugated diene-based compound, or a copolymer of a conjugated diene-based compound and an ethylenically unsaturated compound, and the conjugated diene-based compound may be one or more selected from the group consisting of 1,3-butadiene, 2-ethyl-1,3-butadiene, isoprene, chloroprene and 1,3-pentadiene. In addition, the ethylenically unsaturated compound may comprise an ethylenically unsaturated nitrile compound, an ethylenically unsaturated acid compound, or a mixture thereof, for example, one or more selected from the group consisting of acrylonitrile, methacrylonitrile, α-chloronitrile, styrene, alkyl styrene, vinyl naphthalene, chloroethyl vinyl ether, (meth)acrylamide, dibutyl maleate, dibutyl fumarate and diethyl maleate.

More particularly, the conjugated diene-based rubber latex may be one or more selected from the group consisting of a butadiene homopolymer, an isoprene homopolymer, a butadiene-styrene copolymer, a butadiene-acrylonitrile copolymer and an isobutylene-isoprene copolymer. More particularly, the conjugated diene-based rubber latex may be a butadiene homopolymer.

In the disclosure of the present invention, the (meth) acrylic acid ester has meaning comprising an acrylic acid ester and a methacrylic acid ester, and the (meth)acrylic acid ester compound (b) may be one or more selected from the group consisting of an acrylic acid alkyl ester and a methacrylic acid alkyl ester.

In the thermoplastic resin composition according to an embodiment of the present invention, the (meth)acrylic acid ester compound (b) in the intermediate layer (A-2) may be (b-1) an acrylic acid ester compound, and the (meth)acrylic acid ester compound (b) in the graft layer (A-3) and the (meth)acrylic acid ester compound (b) in the (B) thermoplastic copolymer may be (b-2) a methacrylic acid ester compound.

The acrylic acid alkyl ester may particularly be one or more selected from the group consisting of methyl acrylate, ethyl acrylate, propyl acrylate, butyl acrylate, hexyl acrylate, and 2-ethylhexyl acrylate, more particularly, butyl acrylate.

In addition, the methacrylic acid alkyl ester may particularly be one or more selected from the group consisting of methyl methacrylate, ethyl methacrylate, propyl methacrylate, butyl methacrylate, hexyl methacrylate, and 2-ethylhexyl methacrylate, more particularly, methyl methacrylate.

The aromatic vinyl compound (c) may be one or more selected from the group consisting of styrene, α-methylstyrene, vinyl toluene, alkyl styrene substituted with a $C_{1-3}$ alkyl group (for example, o-methylstyrene, m-methylstyrene, p-methylstyrene, p-ethylstyrene, etc.), and styrene substituted with halogen, particularly, styrene.

The vinyl cyan compound (d) may be one or more selected from the group consisting of acrylonitrile, methacrylonitrile and the derivatives thereof, more particularly, acrylonitrile.

The graft copolymer having a multilayer structure (A) may particularly be prepared by forming an intermediate layer (A-2) on a core (A-1) by polymerizing a (meth)acrylic acid ester compound (b), an aromatic vinyl compound (c), and a vinyl cyan compound (d) with respect to a conjugated diene-based rubber latex (a), and by forming a graft layer (A-3) on the intermediate layer (A-2) by polymerizing a (meth)acrylic acid ester compound (b), c) an aromatic vinyl compound and d) a vinyl cyan compound. The intermediate layer (A-2) and the graft layer (A-3) may be graft polymerized, for example, may be prepared by a preparation method of graft polymerizing the compounds (b), (c) and (d) using a molecular weight controlling agent.

The molecular weight controlling agent is for controlling the molecular weight of the graft copolymer having a multilayer structure (A) thus prepared, and may be used in an amount of 0.01 parts by weight to 1 part by weight, particularly, 0.02 parts by weight to 0.8 parts by weight, more particularly 0.05 parts by weight to 0.5 parts by weight based on total 100 parts by weight of a monomer which is grafted into the conjugated diene-based rubber latex. If the amount of the molecular weight controlling agent deviates from the above-mentioned range and is used too small or excessively large, the molecular weight of the graft copolymer having a multilayer structure (A) thus prepared may be too small to degrade chemical resistance or the molecular weight thereof may be too large to deteriorate moldability. The kind of molecular weight controlling agent is not specifically limited, but may be, for example, mercaptans. Particular examples may be one or more selected from the group consisting of n-butyl mercaptan, n-octyl mercaptan, n-dodecyl mercaptan and t-dodecyl mercaptan.

The conjugated diene-based rubber latex (a) may be prepared by a commonly known method in the art, and the preparation method thereof is not specifically limited. For example, the conjugated diene-based rubber latex may be prepared by selectively injecting one or more additives such as ion exchange water, an emulsifier, a polymerization initiator, an electrolyte and a molecular weight controlling agent to a conjugated diene-based compound, or a mixture of a conjugated diene-based compound and an ethylenically unsaturated compound, and then performing emulsion polymerization.

For example, the conjugated diene-based rubber latex (b) may be prepared by injecting 70 parts by weight to 120 parts by weight of ion exchange water, 0.2 parts by weight to 2.5 parts by weight of an emulsifier, 0.1 parts by weight to 1.5 parts by weight of a polymerization initiator, 0.5 parts by weight to 2 parts by weight of an electrolyte and 0.1 parts by weight to 1 part by weight of a molecular weight controlling agent based on 100 parts by weight of the conjugated diene-based compound in batch to a polymerization reactor, and reacting at 50° C. to 90° C. In this case, the conjugated diene-based compound, the ethylenically unsaturated compound, and the molecular weight controlling agent may be the same material as described above, or a material comprising the same.

The polymerization initiator is not specifically limited, but for example, may use a water-soluble persulfate-based polymerization initiator such as potassium persulfate, sodium persulfate and ammonium persulfate, and a redox-based polymerization initiator comprising a peroxide, as one component, such as hydrogen peroxide, cumene hydroperoxide, diisopropylbenzene hydroperoxide, tert-butyl hydroperoxide, and p-mentane hydroperoxide, solely or as a mixture.

The emulsifier is not specifically limited but may use, for example, one selected from the group consisting of alkyl aryl sulfonate, alkali methyl alkyl sulfate, sulfonated alkyl ester, soap of fatty acid and alkaline salt of rosin acid, or a mixture of two or more.

The electrolyte is not specifically limited but may be, for example, one selected from the group consisting of potassium chloride (KCl), sodium chloride (NaCl), potassium bicarbonate ($KHCO_3$), sodium bicarbonate ($NaHCO_3$), potassium carbonate ($K_2CO_3$), sodium carbonate ($Na_2CO_3$), potassium bisulfite ($KHSO_3$), sodium bisulfite ($NaHSO_3$), tetrapotassium pyrophosphate ($K_4P_2O_7$), tetrasodium pyrophosphate ($Na_4P_2O_7$), tripotassium phosphate ($K_3PO_4$), trisodium phosphate ($Na_3PO_4$), dipotassium hydrogen phosphate ($K_2HPO_4$) and disodium hydrogen phosphate ($Na_2HPO_4$), or a mixture of two or more.

The conjugated diene-based rubber latex (a) prepared by a direct polymerization method may have a weight average particle diameter of 500 Å to 2,000 Å, particularly, a weight average particle diameter of 500 Å to 1,600 Å, as described above. In this case, the weight average particle diameter is measured by a dynamic laser light scattering method (Laser scattering analyzer, Nicomp 370 HPL), and "Å" means a length unit commonly used for expressing the wavelength of electromagnetic radiation, where 1 Å is the same as 0.1 nm. In the present invention, the weight average particle diameter is defined by the following Mathematical Equation 2:

$$\Sigma nd^4 / \Sigma nd^3 \qquad \text{[Mathematical Equation 2]}$$

In Mathematical Equation 2, n represents number of particles, and d represents diameter of a particle.

The intermediate layer (A-2) may be formed on the conjugated diene-based rubber latex core by selectively mixing (A-1) (a) the core of the conjugated diene-based rubber latex with a (meth)acrylic acid ester compound (b), particularly, an acrylic acid ester compound (b-1), an aromatic vinyl compound (c), and a vinyl cyan-based compound (d) with one or more additives such as an emulsifier, a polymerization initiator and a molecular weight controlling agent, and then graft polymerizing.

For example, the intermediate layer may be formed on the conjugated diene-based rubber latex core by injecting to a polymerization reactor filled with 20 wt % to 80 wt % of (A-1) (a) the core of the conjugated diene-based rubber latex, 10 wt % to 40 wt % of a monomer mixture for preparing the intermediate layer (A-2) comprising an acrylic acid ester compound (b-1), an aromatic vinyl compound (c), and a vinyl cyan compound (d), and 0.05 parts by weight to 0.4 parts by weight of a molecular weight controlling agent, 0.1 parts by weight to 0.5 parts by weight of an emulsifier, and 0.05 parts by weight to 0.3 parts by weight of a polymerization initiator, based on total 100 parts by weight of a mixture of the core and monomers, and copolymerizing at a temperature range of 50° C. to 80° C. for 3 hours to 6 hours. In this case, the monomer mixture constituting a shell may be used in the above-mentioned amount, and by using the molecular weight controlling agent in the above-mentioned range, appropriate chemical resistance and excellent moldability may be achieved.

The graft layer (A-3) may be formed on the intermediate layer (A-2) formed by the above-mentioned method, by mixing a (meth)acrylic acid ester compound (b), particularly, a methacrylic acid ester compound (b-2), an aromatic vinyl compound (c) and a vinyl cyan-based compound (d) selectively with one or more additives such as an emulsifier, a polymerization initiator and a molecular weight controlling agent, and then graft polymerizing.

For example, the graft layer (A-3) may be formed on the intermediate layer by additionally injecting 10 wt % to 40 wt % of a monomer mixture for preparing the graft layer (A-3) comprising a methacrylic acid ester compound (b-2), an aromatic vinyl compound (c), and a vinyl cyan compound (d), and 0.05 parts by weight to 0.4 parts by weight of a molecular weight controlling agent, 0.1 parts by weight to 0.5 parts by weight of an emulsifier, and 0.05 parts by weight to 0.3 parts by weight of a polymerization initiator, based on total 100 parts by weight of a mixture of the core and the monomers, to a polymerization reactor in which the intermediate layer (A-2) is formed, and copolymerizing at a temperature range of 50° C. to 80° C. for 3 hours to 6 hours. In this case, the monomer mixture constituting a shell may be used in the same amount mentioned above, and by using the molecular weight controlling agent in the above-mentioned range, appropriate chemical resistance and excellent moldability may be achieved.

After performing the polymerization process, washing and drying processes may be additionally performed. For example, a graft copolymer in a powder state may be obtained by injecting an antioxidant and a stabilizer to the reactor in which the polymerization is finished, adding calcium chloride, an aqueous magnesium sulfate solution or an aqueous sulfuric acid solution, and coagulating, dehydrating, and drying.

In addition, the materials may be injected in batch, or the remaining amount or a partial amount may be injected continuously (one by one). Such a batch injection and continuous injection methods may be appropriately controlled and used together.

(B) Thermoplastic Copolymer

The thermoplastic copolymer (B) is obtained by copolymerizing a composition comprising a (meth)acrylic acid ester compound (b), an aromatic vinyl compound (C), and a vinyl cyan-based compound (d). The thermoplastic copolymer (B) is not specifically limited but may be a bulk polymer prepared by bulk polymerization.

In order that the thermoplastic copolymer (B) has the refractive index difference with the graft copolymer (A) of less than 0.003 to increase the transparency of the thermoplastic resin composition, the weight ratio of the (meth) acrylic acid ester, the aromatic vinyl compound and the vinyl cyan compound may preferably be controlled appropriately.

The thermoplastic copolymer (B) may comprise a repeating unit derived from a (meth)acrylic acid ester compound (b), a repeating unit derived from an aromatic vinyl compound (c), and a repeating unit derived from a vinyl cyan compound (d), in amounts of 20 parts by weight to 80 parts by weight, 10 parts by weight to 50 parts by weight, and 0.1 parts by weight to 25 parts by weight, respectively, particularly, in amounts of 30 parts by weight to 75 parts by weight, 15 parts by weight to 40 parts by weight, and 1 part by weight to 20 parts by weight. If the thermoplastic copolymer (B) comprises the repeating unit derived from the (meth) acrylic acid ester compound (b), the repeating unit derived from the aromatic vinyl compound (c), and the repeating unit derived from the vinyl cyan compound (d), in the above-mentioned ranges, respectively, the thermoplastic resin composition may show excellent transparency and whitening resistance.

If the thermoplastic copolymer (B) comprises the repeating unit derived from the (meth)acrylic acid ester compound (b), the repeating unit derived from the aromatic vinyl compound (c), and the repeating unit derived from the vinyl cyan compound (d), in amounts deviated from the above-mentioned ranges, the transparency of the thermoplastic resin composition may be degraded, and if the repeating unit derived from the (meth)acrylic acid ester compound (b) deviates from the above-mentioned range, transparency may be degraded, and if the amount of the repeating unit derived from the vinyl cyan compound (d) is greater than the above-mentioned range, yellowing of a resin may occur.

Particularly, the thermoplastic copolymer (B) may be a methyl methacrylate-styrene-acrylonitrile copolymer (MSAN), more particularly, MSAN satisfying the above-mentioned weight average molecular weight and molecular weight distribution conditions.

Meanwhile, the thermoplastic copolymer (B) may be prepared by a commonly known method in the art and is not specifically limited. For example, the thermoplastic copolymer (B) may be prepared by bulk polymerizing the (meth) acrylic acid ester compound (b), particularly, the methacrylic acid ester compound (b-2), the aromatic vinyl compound (c), and the vinyl cyan compound (d). Particularly, the thermoplastic copolymer (B) may be prepared by the steps of mixing 26 parts by weight to 30 parts by weight of a reaction medium and 0.05 parts by weight to 0.5 parts by weight of a molecular weight controlling agent with respect to 100 parts by weight of a monomer mixture comprising 20 parts by weight to 80 parts by weight of the methacrylic acid ester (b), 10 parts by weight to 50 parts by weight of the aromatic vinyl compound (c), and 1 part by weight to 25 parts by weight of the vinyl cyan compound (d), reacting for 2 hours to 4 hours while keeping a temperature range to 140° C. to 170° C. to prepare a polymer, and removing an unreacted material and the reaction medium.

The reaction medium may use common organic solvents, particularly, an aromatic hydrocarbon compound such as ethylbenzene, benzene, toluene, and xylene; a ketone-based compound such as methyl ethyl ketone and acetone; an aliphatic hydrocarbon compound such as n-hexane; a halogenated hydrocarbon compound such as chloroform; and an alicyclic hydrocarbon compound such as cyclohexane.

The polymerization of the thermoplastic copolymer (B) may be performed by additionally adding an additive such as a polymerization initiator and a molecular weight controlling agent in addition to materials comprising the above-mentioned monomer mixture. The additive may be the above-mentioned materials or a material comprising the same.

The molecular weight controlling agent is for controlling the molecular weight of the thermoplastic copolymer (B) thus prepared, and may be used in an amount of 0.01 parts by weight to 1 part by weight, particularly, 0.02 parts by weight to 0.5 parts by weight, more particularly 0.05 parts by weight to 0.4 parts by weight based on total 100 parts by weight of a monomer for preparing the thermoplastic copolymer (B). If the amount of the molecular weight controlling agent deviates from the above-mentioned range and is too small or excessively large, the molecular weight of the thermoplastic copolymer (B) thus prepared may be too small, and chemical resistance may be degraded or the molecular weight thereof may be too large, thereby deteriorating moldability.

The bulk polymerization may be performed in a continuous process apparatus composed of a raw material injecting pump, a continuous stirring bath, a pre-heating bath, a volatilization bath, a polymer transporting pump and an extrusion processing apparatus.

The thermoplastic resin composition according to an embodiment of the present invention comprises the graft copolymer having a multilayer structure (A) and a thermoplastic copolymer (B) as described above, and may comprise each copolymer in combination such that the refractive index difference between two copolymers may become less than 0.01, particularly, less than 0.005, more particularly, less than 0.003 through the control of the kind and amounts of monomers constituting each copolymer. As described above, if the refractive index difference between two copolymers is less than 0.01, particularly, less than 0.005, more particularly, less than 0.003, or if the refractive indexes are the same, the transparency of the thermoplastic resin composition may be largely improved. In this case, each refractive index of the graft copolymer having a multilayer structure (A) and the thermoplastic copolymer (B) is not significantly limited, but the two copolymers may have refractive indexes of 1.51 to 1.53, particularly, 1.513 to 1.519, respectively, considering remarkable improving effect of transparency.

The thermoplastic resin composition according to an embodiment of the present invention may comprise the graft copolymer (A) and the thermoplastic copolymer (B), having the above-mentioned refractive index difference in a weight ratio of 25:75 to 70:30, particularly, 30:70 to 65:35. By comprising the two copolymers in optimized weight ratios, the thermoplastic resin composition may have an appropriate modulus, and excellent impact strength and chemical resistance may be achieved.

The thermoplastic resin composition according to an embodiment of the present invention may particularly comprise 20 wt % to 30 wt % of the conjugated diene-based rubber latex (a), 5 wt % to 21 wt % of the acrylic acid ester compound (b-1), 15 wt % to 35 wt % of the aromatic vinyl compound (c), 1 wt % to 35 wt % of the vinyl cyan compound (d), and 15 wt % to 50 wt % of the methacrylic acid ester compound (b-2) with respect to the total weight of the thermoplastic resin composition.

Meanwhile, the thermoplastic resin composition according to the present invention may further comprise one or more additives such as a lubricant, an antioxidant and an ultraviolet stabilizer in addition to the copolymer.

The lubricant is not specifically limited but may be, for example, ethylene bis stearamide, oxidized polyethylene wax, magnesium stearate, or a mixture thereof, and the amount used thereof may be 0.1 parts by weight to 5 parts by weight, particularly 0.5 parts by weight to 2 parts by weight with respect to 100 parts by weight of the thermoplastic resin composition.

The antioxidant is not specifically limited but may be, for example, a phenol-based antioxidant or a phosphate-based antioxidant, particularly, stearyl-$\beta$-(3,5-di-t-butyl-4-hydroxyphenyl)propionate, etc. The amount used thereof may be 0.5 parts by weight to 2 parts by weight with respect to 100 parts by weight of the thermoplastic resin composition.

The ultraviolet stabilizer is not specifically limited but may be a commonly used one in the art, particularly, 2(2'-hydroxy-3',5'-di-tert-butylphenyl)-5-chloro benzotriazole. The amount used thereof may be 0.05 parts by weight to 3 parts by weight, particularly, 0.2 parts by weight to 1 part by weight with respect to 100 parts by weight of the thermoplastic resin composition.

In addition, there is provided in the present a thermoplastic resin molded product manufactured from the thermoplastic resin composition.

The thermoplastic resin molded product manufactured from the thermoplastic resin composition may have not only chemical resistance but also excellent impact resistance and transparency, and may be usefully used as a material requiring excellent impact resistance, transparency and chemical resistance at the same time.

MODE FOR CARRYING OUT THE INVENTION

Hereinafter, the present invention will be explained in more detail referring to examples and experimental examples. However, the examples and the experimental examples are only for illustrating the present invention, and the scope of the present invention is not limited thereto.

Preparation Example 1

Preparation of Thermoplastic Graft Resin

In order to obtain a graft copolymer, to 50 parts by weight of a polybutadiene rubber latex which was prepared by emulsion polymerization and had a gel content of 90% and an average particle diameter of 1,000 Å, 100 parts by weight of ion exchange water, 0.5 parts by weight of a sodium dodecylbenzenesulfonate emulsifier, 11 parts by weight of butyl acrylate, 7.5 parts by weight of styrene, 1.5 parts by weight of acrylonitrile, 0.05 parts by weight of ethylenediaminetetraacetic acid, 0.1 parts by weight of sodium formaldehyde sulfoxylate, 0.001 parts by weight of ferrous sulfide, and 0.1 parts by weight of tert-butyl hydroperoxide were continuously injected at 70° C. for 3 hours and reacted. In this case, a small amount of latex was sampled and agglomerated using calcium chloride as a coagulating agent, dehydrated and dried to obtain a powder. The glass transition temperature of an intermediate layer was −5° C. and the refractive index thereof was 1.516.

Then, additionally, 50 parts by weight of ion exchange water, 0.5 parts by weight of a sodium dodecylbenzenesulfonate emulsifier, 20 parts by weight of methyl methacrylate, 7 parts by weight of styrene, 3 parts by weight of acrylonitrile, 0.05 parts by weight of ethylenediaminetetraacetic acid, 0.1 parts by weight of sodium formaldehyde sulfoxylate, 0.001 parts by weight of ferrous sulfide, 0.3 parts by weight of tert-dodecylmercaptan, and 0.1 parts by weight of tert-butyl hydroperoxide were continuously injected at 75° C. for 3 hours and reacted. After the reaction, the temperature was elevated to 80° C., aging was performed for 1 hours, and the reaction was finished. The latex thus obtained was coagulated using 2 parts by weight of calcium chloride as a coagulating agent, dehydrated and dried to obtain a powder. The glass transition temperature of a graft layer was 100° C. and the refractive index of the graft copolymer thus obtained was 1.516.

Preparation Example 2

Preparation of Thermoplastic Graft Resin

In order to obtain a graft copolymer, to 40 parts by weight of a polybutadiene rubber latex which was prepared by emulsion polymerization and had a gel content of 90% and an average particle diameter of 1,200 Å, 100 parts by weight of ion exchange water, 0.5 parts by weight of a sodium dodecylbenzenesulfonate emulsifier, 13 parts by weight of methyl acrylate, 6.5 parts by weight of styrene, 0.5 parts by weight of acrylonitrile, 0.05 parts by weight of ethylenediaminetetraacetic acid, 0.1 parts by weight of sodium formaldehyde sulfoxylate, 0.001 parts by weight of ferrous sulfide, and 0.1 parts by weight of tert-butyl hydroperoxide were continuously injected at 70° C. for 3 hours and reacted. In this case, a small amount of latex was sampled and agglomerated using calcium chloride as a coagulating agent, dehydrated and dried to obtain a powder. The glass transition temperature of an intermediate layer was 33° C. and the refractive index thereof was 1.516. Then, additionally, 50 parts by weight of ion exchange water, 0.5 parts by weight of a sodium dodecylbenzenesulfonate emulsifier, 26 parts by weight of methyl methacrylate, 9 parts by weight of styrene, 5 parts by weight of acrylonitrile, 0.05 parts by weight of ethylenediaminetetraacetic acid, 0.1 parts by weight of sodium formaldehyde sulfoxylate, 0.001 parts by weight of ferrous sulfide, 0.3 parts by weight of tert-dodecylmercaptan, and 0.15 parts by weight of tert-butyl hydroperoxide were continuously injected at 75° C. for 3 hours and reacted. After the reaction, the temperature was elevated to 80° C., aging was performed for 1 hours, and the reaction was finished. The latex thus obtained was coagulated using 2 parts by weight of calcium chloride as a coagulating agent, dehydrated and dried to obtain a powder. The glass transition temperature of a graft layer was 101° C. and the refractive index of the graft copolymer thus obtained was 1.516.

Preparation Example 3

Preparation of Thermoplastic Graft Resin

In order to obtain a graft copolymer, to 50 parts by weight of a polybutadiene rubber latex which was prepared by emulsion polymerization and had a gel content of 70% and an average particle diameter of 3,000 Å, 100 parts by weight of ion exchange water, 0.5 parts by weight of a sodium dodecylbenzenesulfonate emulsifier, 11 parts by weight of butyl acrylate, 7.5 parts by weight of styrene, 1.5 parts by weight of acrylonitrile, 0.05 parts by weight of ethylenediaminetetraacetic acid, 0.1 parts by weight of sodium formaldehyde sulfoxylate, 0.001 parts by weight of ferrous sulfide, and 0.1 parts by weight of tert-butyl hydroperoxide were continuously injected at 70° C. for 3 hours and reacted. In this case, a small amount of latex was sampled and agglomerated using calcium chloride as a coagulating agent, dehydrated and dried to obtain a powder. The glass transition temperature of an intermediate layer was −5° C. and the refractive index thereof was 1.516.

Then, additionally, 50 parts by weight of ion exchange water, 0.5 parts by weight of a sodium dodecylbenzenesulfonate emulsifier, 20 parts by weight of methyl methacrylate, 7 parts by weight of styrene, 3 parts by weight of acrylonitrile, 0.05 parts by weight of ethylenediaminetetraacetic acid, 0.1 parts by weight of sodium formaldehyde sulfoxylate, 0.001 parts by weight of ferrous sulfide, 0.3 parts by weight of tert-dodecylmercaptan, and 0.1 parts by weight of tert-butyl hydroperoxide were continuously injected at 75° C. for 3 hours and reacted. After the reaction, the temperature was elevated to 80° C., aging was performed for 1 hours, and the reaction was finished. The latex thus obtained was coagulated using 2 parts by weight of calcium chloride as a coagulating agent, dehydrated and dried to obtain a powder. The glass transition temperature of a graft layer was 100° C. and the refractive index of the graft copolymer thus obtained was 1.516.

Preparation Example 4

Preparation of Thermoplastic Graft Resin

In order to obtain a graft copolymer, to 50 parts by weight of a polybutadiene rubber latex which was prepared by emulsion polymerization and had a gel content of 90% and an average particle diameter of 1,000 Å, 100 parts by weight of ion exchange water, 0.5 parts by weight of a sodium dodecylbenzenesulfonate emulsifier, 9.6 parts by weight of butyl acrylate, 10.4 parts by weight of styrene, 1 part by weight of acrylonitrile, 0.05 parts by weight of ethylenediaminetetraacetic acid, 0.1 parts by weight of sodium formaldehyde sulfoxylate, 0.001 parts by weight of ferrous sulfide, and 0.1 parts by weight of tert-butyl hydroperoxide were continuously injected at 70° C. for 3 hours and reacted. In this case, a small amount of latex was sampled and agglomerated using calcium chloride as a coagulating agent, dehydrated and dried to obtain a powder. The glass transition temperature of an intermediate layer was 5° C. and the refractive index thereof was 1.53.

Then, additionally, 50 parts by weight of ion exchange water, 0.5 parts by weight of a sodium dodecylbenzenesulfonate emulsifier, 15.8 parts by weight of methyl methacrylate, 11.2 parts by weight of styrene, 3 parts by weight of acrylonitrile, 0.05 parts by weight of ethylenediaminetetraacetic acid, 0.1 parts by weight of sodium formaldehyde sulfoxylate, 0.001 parts by weight of ferrous sulfide, 0.3 parts by weight of tert-dodecylmercaptan, and 0.1 parts by weight of tert-butyl hydroperoxide were continuously injected at 75° C. for 3 hours and reacted. After the reaction, the temperature was elevated to 80° C., aging was performed for 1 hours, and the reaction was finished. The latex thus obtained was coagulated using 2 parts by weight of calcium chloride as a coagulating agent, dehydrated and dried to obtain a powder. The glass transition temperature of a graft layer was 98° C. and the refractive index of the graft copolymer thus obtained was 1.53.

Preparation Example 5

Preparation of Thermoplastic Graft Resin

In order to obtain a graft copolymer, to 50 parts by weight of a polybutadiene rubber latex which was prepared by emulsion polymerization and had a gel content of 90% and an average particle diameter of 1,000 Å, 100 parts by weight of ion exchange water, 1.0 part by weight of a sodium dodecylbenzenesulfonate emulsifier, 35 parts by weight of methyl methacrylate, 12 parts by weight of styrene, 3 parts by weight of acrylonitrile, 0.5 parts by weight of tert-dodecylmercaptan, 0.05 parts by weight of ethylenediaminetetraacetic acid, 0.1 parts by weight of sodium formaldehyde sulfoxylate, 0.001 parts by weight of ferrous sulfide, and 0.2 parts by weight of tert-butyl hydroperoxide were continuously injected at 75° C. for 5 hours and reacted. After the reaction, the temperature was elevated to 80° C., aging was performed for 1 hours, and the reaction was finished. The latex thus obtained was coagulated using 2 parts by weight of calcium chloride as a coagulating agent, dehydrated and dried to obtain a powder. The glass transition temperature of a graft layer was 100° C. and the refractive index of the graft copolymer thus obtained was 1.516.

Preparation Example 6

Preparation of Thermoplastic Resin (MSAN Resin)

To 70.4 parts by weight of methyl methacrylate, 24.6 parts by weight of styrene, and 5 parts by weight of acrylonitrile, a mixture material of 30 parts by weight of toluene as a solvent and 0.15 parts by weight of tertiary dodecylmercaptan as a molecular weight controlling agent was continuously injected to a reaction bath so that average reaction time was 3 hours and the reaction temperature was kept to 148° C. A polymerization solution discharged from the reaction bath was heated in a pre-heating bath, and unreacted monomers were volatilized from a volatilization bath. The temperature of a polymer was kept to 210° C. and a copolymer resin was processed into a pellet shape using a polymer transporting pump extrusion processing apparatus. The glass transition temperature of a graft layer was 100° C. and the refractive index of a thermoplastic polymer thus obtained was 1.516.

Preparation Example 7

Preparation of Thermoplastic Resin (MSAN Resin)

The same method as in Preparation Example 6 was performed except for using 44 parts by weight of methyl methacrylate and 51 parts by weight of styrene instead of 70.4 parts by weight of methyl methacrylate and 24.6 parts by weight of styrene. The glass transition temperature of the thermoplastic polymer thus prepared was 97° C. and the refractive index thereof was 1.542.

The refractive indexes of the resins prepared in Preparation Examples 1 to 7 were measured as follows.

The refractive indexes of the resins prepared in Preparation Examples 1 to 7 were calculated according to Mathematical Equation 1 using the refractive index and amount of each polymer constituting the graft copolymer. The refractive index of a resin was measured by manufacturing a specimen with a thickness of 40 μm and irradiating light of 450 nm using an Abbe refractometer.

$$RI = \Sigma(Wti \times RIi)$$ [Mathematical Equation 1]

In Mathematical Equation 1, Wti is a weight fraction (%) of each component (or polymer) in the graft copolymer, and RIi is the refractive index of a polymer for forming the graft copolymer.

Example 1

50 parts by weight of the graft copolymer prepared in Preparation Example 1 and 50 parts by weight of the thermoplastic resin prepared in Preparation Example 5 were mixed, and 0.3 parts by weight of ethylene bis stearamide and 0.2 parts by weight of stearyl-β-(3,5-di-tert-butyl-4-hydroxyphenyl)propionate were injected, and formed into a pellet shape using a biaxial extrusion kneading machine at a cylinder temperature of 220° C. to prepare a thermoplastic transparent resin.

Examples 2 to 4, and Comparative Examples 1 TO 6

Thermoplastic transparent resins were prepared by the same method as in Example 1 except for changing the kinds and amounts of the graft copolymers and the thermoplastic resins as in Table 1.

TABLE 1

| | Graft copolymer | | | | | Thermoplastic resin | |
| --- | --- | --- | --- | --- | --- | --- | --- |
| | Preparation Example 1 | Preparation Example 2 | Preparation Example 3 | Preparation Example 4 | Preparation Example 5 | Preparation Example 6 | Preparation Example 7 |
| Example 1 | 50 | — | — | — | — | 50 | — |
| Example 2 | 60 | — | — | — | — | 40 | — |
| Example 3 | — | 40 | — | — | — | 60 | — |
| Example 4 | — | 65 | — | — | — | 35 | — |
| Comparative Example 1 | — | — | 55 | — | — | 45 | — |
| Comparative Example 2 | — | — | — | 60 | — | 40 | — |
| Comparative Example 3 | — | — | — | — | 50 | 40 | — |
| Comparative Example 4 | 20 | — | — | — | — | 80 | — |
| Comparative Example 5 | 30 | — | 30 | — | — | 40 | — |

TABLE 1-continued

| | Graft copolymer | | | | | Thermoplastic resin | |
|---|---|---|---|---|---|---|---|
| | Preparation Example 1 | Preparation Example 2 | Preparation Example 3 | Preparation Example 4 | Preparation Example 5 | Preparation Example 6 | Preparation Example 7 |
| Comparative Example 6 | 60 | — | — | — | — | — | 40 |

In Table 1 above, glass transition temperature (Tg) was measured using a differential scanning calorimeter (DSC: Differential Scanning Calorimeter 6000) manufactured by PerKinElmer Co. In detail, by using DSC, under a nitrogen atmosphere, the temperature was increased to 200° C., kept for 5 minutes, decreased to 30° C., and a DSC curve was observed while increasing the temperature. In this case, the temperature increasing rate and decreasing rate were 10° C./min, respectively.

EXPERIMENTAL EXAMPLES

The transparency and whitening properties of the thermoplastic resin compositions prepared in Examples 1 to 4 and Comparative Examples 1 to 6 were evaluated. The results are shown in Table 2 below.

1) Transparency (Haze)

In order to compare and analyze the transparency of the thermoplastic transparent resin compositions prepared in Examples 1 to 4 and Comparative Examples 1 to 6, the haze of each thermoplastic transparent resin composition was measured.

The haze was measured after manufacturing each specimen with a thickness of 3 mm by extrusion molding the pellet of each thermoplastic transparent resin composition at 230° C., and storing each specimen at room temperature (about 23° C.) for 24 hours according to A method of DIN 75201.

2) Whitening Properties

The pellet of each of the thermoplastic transparent resin compositions prepared in Examples 1 to 4 and Comparative Examples 1 to 6 was injected into a sheet extruder to manufacture an edge roll having a width of 2 cm and a thickness of 1.5 mm.

The generation of whitening of the edge roll thus manufactured was checked for wooden boards with a curvature of R (unit: mm), as shown in FIG. 1. If R decreases, a bending degree may become severe and the generation of whitening may increase.

o: whitening was not generated
x: whitening was generated

Table 2

| Division | Transparency (Haze, %) | Whitening properties (R = 20) | Whitening properties (R = 15) | Whitening properties (R = 10) |
|---|---|---|---|---|
| Example 1 | 0.7 | o | o | o |
| Example 2 | 0.8 | o | o | o |
| Example 3 | 0.6 | o | o | o |
| Example 4 | 0.8 | o | o | o |
| Comparative Example 1 | 2.2 | x | x | x |
| Comparative Example 2 | 43.2 | o | o | o |
| Comparative Example 3 | 0.6 | o | x | x |
| Comparative Example 4 | 0.5 | x | x | x |
| Comparative Example 5 | 1.1 | x | x | x |
| Comparative Example 6 | 36.7 | o | o | o |

From the experimental results, it was found that the thermoplastic resins of Examples 1 to 4 according to the present invention showed excellent transparency and whitening resistance. In Comparative Example 1 and Comparative Example 5, rubber having an average particle diameter of 3,000 Å was used in whole or in part, and defects of generating whitening occurred when attached furniture edge.

In Comparative Example 2, the refractive indexes of the rubber core (A-1), the intermediate layer (A-2) and the graft layer (A-3) were different, and haze was rapidly increased and transparency was degraded.

In Comparative Example 3, the resin was composed of only a graft layer without an intermediate layer, and whitening was not generated at a high radius of curvature of R=20, but whitening was generated at a low radius of curvature with severe bending.

In Comparative Example 4, the amount of the graft copolymer having a multilayer structure (A) was insufficient, and whitening was generated in case of attaching an edge roll.

In Comparative Example 6, the refractive indexes of the graft copolymer having a multilayer structure (A) and the MSAN resin (B) were different, and haze was rapidly increased and transparency was degraded.

The invention claimed is:
1. A thermoplastic resin composition, comprising (A) a graft copolymer having a multilayer structure, and (B) a thermoplastic copolymer,
wherein the graft copolymer having a multilayer structure (A) comprises: (A-1) a core of (a) a conjugated diene-based rubber latex; and (A-2) an intermediate layer comprising a repeating unit derived from (b) a (meth) acrylic acid ester compound, a repeating unit derived from (c) an aromatic vinyl compound, and a repeating unit derived from (d) a vinyl cyan compound; and (A-3) a graft layer comprising a repeating unit derived from (b) a (meth)acrylic acid ester compound, a repeating unit derived from (c) an aromatic vinyl compound, and a repeating unit derived from (d) a vinyl cyan compound, the core (A-1) of (a) the conjugated diene-based rubber latex has a weight average particle diameter of 500 Å to 2,000 Å, a glass transition temperature of the intermediate layer (A-2) is 40° C. or less, and the glass transition temperature of the graft layer (A-3) is 80° C. or more, the thermoplastic copolymer (B) comprises a repeating unit derived from (b) a (meth)acrylic acid ester compound, a repeating unit derived from (c) an aromatic vinyl compound, and a repeating unit derived from (d) a vinyl cyan compound, a difference of refractive indexes between the graft copolymer having a multilayer structure (A) and the thermoplastic copolymer (B) is less than 0.01, wherein the graft copolymer having a multilayer structure (A) and the thermoplastic copolymer (B) have a weight ratio of 25:75 to 70:30, and wherein the graft copolymer having a multilayer structure (A) comprises, the core (A-1), the intermediate layer (A-2) and the graft layer (A-3) in amounts of 40 parts by weight to 60 parts by weight, 10 parts by weight to 30 parts by weight, and 20 parts by weight to 40 parts by weight, respectively.

2. The thermoplastic resin composition according to claim 1, wherein the intermediate layer (A-2) comprises the repeating unit derived from (b) the (meth)acrylic acid ester compound, the repeating unit derived from (c) the aromatic vinyl compound, and the repeating unit derived from (d) the vinyl cyan compound, in amounts of 35 parts by weight to 80 parts by weight, 20 parts by weight to 60 parts by weight, and 0.1 parts by weight to 15 parts by weight, respectively.

3. The thermoplastic resin composition according to claim 1, wherein the graft layer (A-3) comprises the repeating unit derived from (b) the (meth)acrylic acid ester compound, the repeating unit derived from (c) the aromatic vinyl compound, and the repeating unit derived from (d) the vinyl cyan compound, in amounts of 35 parts by weight to 80 parts by weight, 15 parts by weight to 50 parts by weight, and 0.1 parts by weight to 20 parts by weight, respectively.

4. The thermoplastic resin composition according to claim 1, wherein each difference of refractive indexes between the core (A-1) and the intermediate layer (A-2); the core (A-1) and the graft layer (A-3); and the intermediate layer (A-2) and the graft layer (A-3) is less than 0.01.

5. The thermoplastic resin composition according to claim 1, wherein the thermoplastic copolymer (B) comprises the repeating unit derived from (b) the (meth)acrylic acid ester compound, the repeating unit derived from (c) the aromatic vinyl compound, and the repeating unit derived from (d) the vinyl cyan compound, in amounts of 20 parts by weight to 80 parts by weight, 10 parts by weight to 50 parts by weight, and 0.1 parts by weight to 25 parts by weight, respectively.

6. The thermoplastic resin composition according to claim 1, wherein the conjugated diene-based rubber latex (a) is a homopolymer of a conjugated diene-based compound, or a copolymer of a conjugated diene-based compound and an ethylenically unsaturated compound.

7. The thermoplastic resin composition according to claim 1, wherein the (meth)acrylic acid ester compound (b) in the intermediate layer (A-2) is (b-1) an acrylic acid ester compound.

8. The thermoplastic resin composition according to claim 7, wherein the acrylic acid ester compound is one or more selected from the group consisting of methyl acrylate, ethyl acrylate, propyl acrylate, butyl acrylate, hexyl acrylate, and 2-ethylhexyl acrylate.

9. The thermoplastic resin composition according to claim 1, wherein the (meth)acrylic acid ester compound (b) in the graft layer (A-3) is (b-2) a methacrylic acid ester compound.

10. The thermoplastic resin composition according to claim 1, wherein the (meth)acrylic acid ester compound (b) in the thermoplastic copolymer (B) is (b-2) a methacrylic acid ester compound.

11. The thermoplastic resin composition according to claim 9, wherein the methacrylic acid ester compound is one or more selected from the group consisting of methyl methacrylate, ethyl methacrylate, propyl methacrylate, butyl methacrylate, hexyl methacrylate and 2-ethylhexyl methacrylate.

12. The thermoplastic resin composition according to claim 1, wherein the aromatic vinyl compound (c) is one or more selected from the group consisting of styrene, α-methylstyrene, vinyltoluene, alkyl styrene substituted with a C1-3 alkyl group, and styrene substituted with halogen.

13. The thermoplastic resin composition according to claim 1, wherein the vinyl cyan compound (d) is one or more selected from the group consisting of acrylonitrile, methacrylonitrile and the derivatives thereof.

14. The thermoplastic resin composition according to claim 1, wherein the (meth)acrylic acid ester compound (b) in the intermediate layer (A-2) is (b-1) an acrylic acid ester compound, the (meth)acrylic acid ester compound (b) in the graft layer (A-3) is (b-2) a methacrylic acid ester compound, and the graft copolymer having a multilayer structure (A) is prepared by forming the intermediate layer (A-2) on the core (A-1) by polymerizing the acrylic acid ester compound (b-1), the aromatic vinyl compound (c), and the vinyl cyan compound (d) with respect to the conjugated diene-based rubber latex (a), and by forming the graft layer (A-3) on the intermediate layer (A-2) by polymerizing the methacrylic acid ester compound (b-2), c) the aromatic vinyl compound and d) the vinyl cyan compound.

15. A method for preparing the thermoplastic resin composition of claim 1, the method comprising:

a step of preparing a graft copolymer having a multilayer structure (A) by forming an intermediate layer (A-2) on a core (A-1) by polymerizing a (meth)acrylic acid ester compound (b), an aromatic vinyl compound (c), and a vinyl cyan compound (d) with respect to a conjugated diene-based rubber latex (a) having a weight average particle diameter of 500 Å to 2,000 Å, and by forming a graft layer (A-3) on the intermediate layer (A-2) by polymerizing a (meth)acrylic acid ester compound (b), an aromatic vinyl compound (c) and a vinyl cyan compound (d);

a step of preparing a thermoplastic copolymer (B) by bulk polymerizing a (meth)acrylic acid ester compound (b), an aromatic vinyl compound (c), and a vinyl cyan compound (d); and a step of mixing (A) the graft copolymer and (B) the thermoplastic copolymer in a weight ratio of 25:75 to 70:30, wherein the graft copolymer having a multilayer structure (A) comprises, the core (A-1), the intermediate layer (A-2) and the graft layer (A-3) in amounts of 40 parts by weight to 60 parts by weight, 10 parts by weight to 30 parts by weight, and 20 parts by weight to 40 parts by weight, respectively.

16. The thermoplastic resin composition according to claim 1, wherein an extrusion of the thermoplastic resin composition having a width of 2 cm and a thickness of 1.5 mm does not exhibit visible whitening when the extrusion is bent over an object with a radius of 20 mm.

* * * * *